United States Patent [19]

Jones et al.

[11] Patent Number: 5,039,150
[45] Date of Patent: Aug. 13, 1991

[54] MULTIPURPOSE BRICK TONGS

[76] Inventors: William E. Jones, 10441 Dylan Pl., Manassas, Va. 22110; Willard E. Jones, 13113 Dumfries Rd., Manassas, Va. 22111

[21] Appl. No.: 461,399

[22] Filed: Jan. 5, 1990

[51] Int. Cl.$^5$ .............................................. B65G 7/12
[52] U.S. Cl. .......................................... 294/3; 294/62
[58] Field of Search ................... 294/62, 2, 3; 7/168, 7/170; 15/235.3; 172/373, 374, 375

[56] References Cited

U.S. PATENT DOCUMENTS

| | | |
|---|---|---|
| 800,341 | 9/1905 | Tift . |
| 1,041,949 | 10/1912 | Bandemer ............................ 294/62 |
| 1,364,128 | 1/1921 | Messinger . |
| 1,385,867 | 7/1921 | Fuller . |
| 1,581,077 | 12/1925 | Mosier . |
| 2,541,863 | 2/1951 | Deans et al. ......................... 294/62 |

FOREIGN PATENT DOCUMENTS 1106704 12/1965 France ................................. 294/62

Primary Examiner—Margaret A. Focarino
Assistant Examiner—Dean J. Kramer
Attorney, Agent, or Firm—Peter J. Georges

[57] ABSTRACT

A multipurpose brick-layer's tool is adaptable for use as brick tongs or as a mortar hoe. In one embodiment of the invention, the tool also functions as a band-cutter for cutting metal bands used in the packaging and transport of bricks. The tool is adjusted using a slide and guide arrangement. A pin and hole adjustment mechanism varies the distance between locking jaws of the multipurpose tool. In this manner, a specific number of bricks can be carried or a hoe handle of preselected length can be formed. An elongated embowed handle arches over the guide tube and has at one end thereof a first clamping jaw. The jaw end portion of the handle is rotatably affixed to a pivot pin extending through opposing walls of the guide tube. A slide tube carried within the guide tube extends outside the guide tube and carries a second clamping jaw complementary to and larger in size than the first clamping jaw. The second clamping jaw is a blade of a size and structure suitable both as a mortar hoe blade and a clamping jaw.

15 Claims, 2 Drawing Sheets

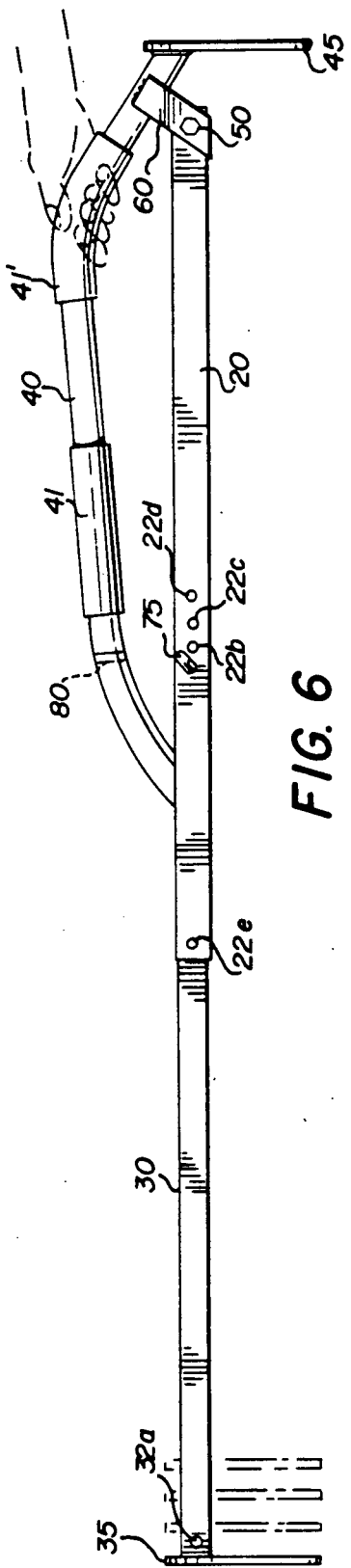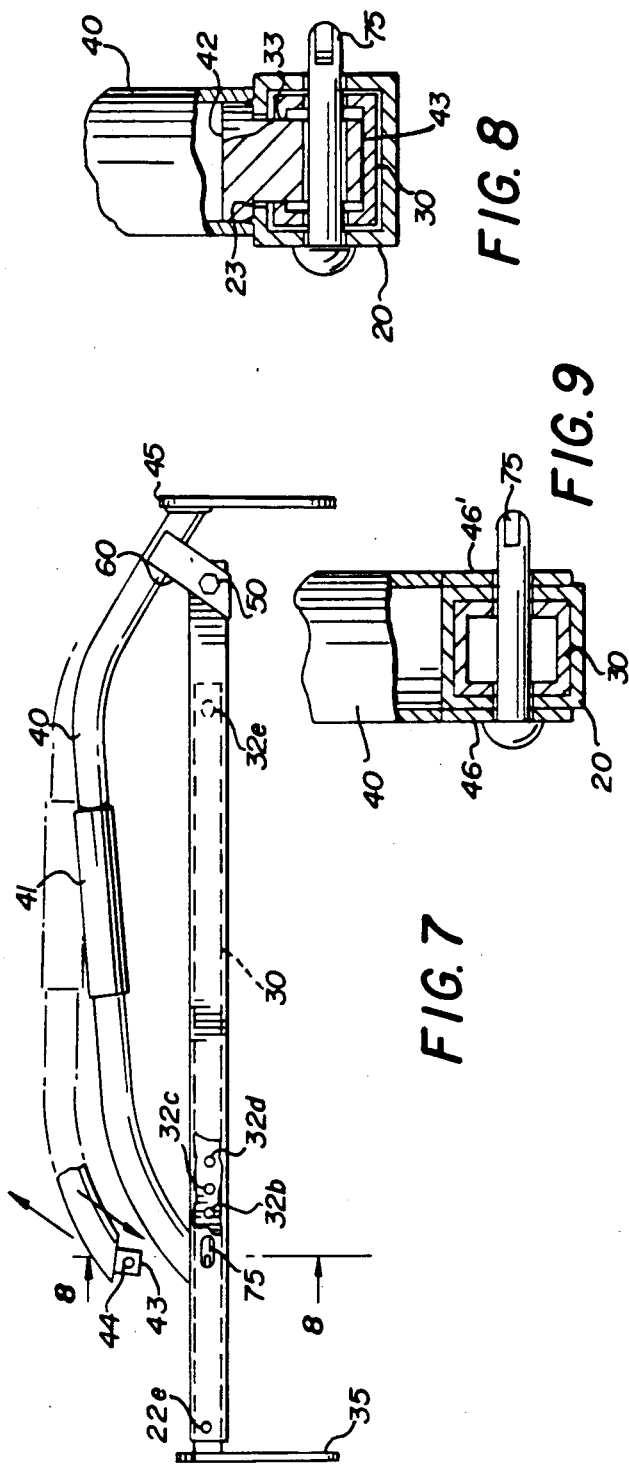

MULTIPURPOSE BRICK TONGS

BACKGROUND OF THE INVENTION

1. Field of the Invention

This invention relates to a multipurpose brick-layer's tool. The tool is adaptable for use as brick tongs or as a mortar hoe. In one embodiment of the invention, the tool also functions as a band-cutter for cutting metal bands of the type used in the packaging and transport of bricks.

2. Discussion of the Prior Art

Brick tongs utilizing complementary gripping jaws, where the jaws are brought into engagement with the faces of bricks by means of a pivotally connected handle are well known. Examples of such tongs are described in the following U.S. Pat. Nos.: 800,341; 835,376; 1,091,260; 1,153,269; 1,364,128; 1,385,867; 1,581,077; and, 3,129,029.

Brick labor helpers have, in their task, used wire cutters/metal-band cutters to access bricks received at the workplace; transported the bricks where such bricks are to be laid by means of brick tongs; and, during brick laying, prepared/maintained the mortar used in laying the brick using mortar hoes of varying configuration (long/short handle).

Because of the need to traverse distances between the brick pallets, mortar boxes and course of bricks being laid, time is wasted using a multiplicity of tools for the foregoing tasks; and, one or another of the tools utilized is often mislaid.

In accordance with the present invention, a multipurpose tool has been developed (1) which can be readily modified to serve as both mortar hoe and brick tongs; and, (2) which can operate in one version of the invention as a band cutting tool.

SUMMARY OF THE INVENTION

The present invention relates to a multipurpose tool. The tool can be configured for use as brick tongs and/or as mortar hoe. The multipurpose tool is comprised of a guide tube suitably of circular or rectangular cross-section which has at one end a pivot pin passing through a hole extending through opposing walls of the guide tube. The other end of the guide tube is open-ended and unobstructed to allow a slide tube to be inserted and telescoped in and out of the guide tube. An elongated embowed handle is arched over the guide tube. The handle has a clamping jaw at one end. The end with the clamping jaw is rotatably affixed to the pivot pin by a pivot pin engaging means which extends from the handle. A space allowing grasping of the handle proximate the jaws is formed between the guide tube and handle, forward of the pivot pin engaging means. The slide tube carried within the guide tube which extends out of the open end of the guide tube carries a second clamping jaw complementary to and larger in size than the first clamping jaw. The second clamping jaw functions as both a jaw of the brick tongs and a mortar hoe blade.

Both the slide and guide tubes have holes alignable with one another. These holes and retaining means form a pin and hole adjustment means for varying the length of the multipurpose tool. The length can be varied to provide carriage of a specific number of bricks or to provide a hoe handle of preselected length. The pin and hole adjustment may be achieved using a cotter pin, spring pawl or other equivalent retaining means cooperating with the oriented holes selected by the user. Holes can be run along the length of the guide and slide tubes or arranged specifically to provide a length which is suitable for carrying a preselected number of bricks.

The end of the handle opposite the end bearing the first clamping jaw is movable downwardly into engagement with the guide tube when the tool is used as a mortar hoe. This latter position with the handle engaging the guide tube can be maintained manually. To facilitate this, an extension may be added at the end of the handle where the handle engages the top of the guide tube. The extension suitably is a plate extending substantially parallel to the surface of the guide tube when handle and guide tube are engaged; preferably, the extension lies substantially flat on the guide tube top, whereby the user can secure the handle to the guide tube and prevent the handle from jiggling around by wrapping his hand around the extension and the guide tube on which it rests. In this manner, manual maintenance of the handle in engagement with the guide tube is facilitated; and, the user avoids having his hand accidentally pinched between guide tube and handle during use of the tool as a hoe. The flat plate optionally can wrap around the guide and clamp onto the sides of the guide by biasing and/or other means of detachable affixation, including spring pawl means and the like, to further assist in maintaining engagement between the handle and the guide tube. Alternatively, other means for locking the opposing end of the handle to the guide tube can be provided. A preferred locking means comprises a hole that is located at the handle end and which is alignable with holes of the slide and guide tubes to form an opening through which pin means can be passed to secure the handle together with the slide and guide tubes. The pin is suitably a cotter pin. Any type of pin-type device can be used, provided it can be secured in position during working of the mortar hoe.

The clamping jaw can include a wire cutting means. The wire cutting means suitably is a V-shaped opening, the mouth of which is situated centrally along the brick-engaging edge of the first clamping jaw. The mortar hoe blade preferably has one or more openings to facilitate mortar mixing.

BRIEF DESCRIPTION OF THE DRAWINGS

FIG. 6 is a side view of the embodiment of FIG. 1 with the tool extended for use as a mortar hoe.

FIG. 7 is a side view of an alternative embodiment of the invention.

FIG. 8 is cross-section taken along 8—8 of FIG. 7.

FIG. 9 is a cross-section taken along 8—8 of FIG. 7 illustrating an alternative structure of the handle locking means.

DESCRIPTION OF THE PREFERRED EMBODIMENT

Referring now to FIGS. 1 to 6 inclusive of the accompanying drawings, there is illustrated one embodiment of the invention.

Figure 1:
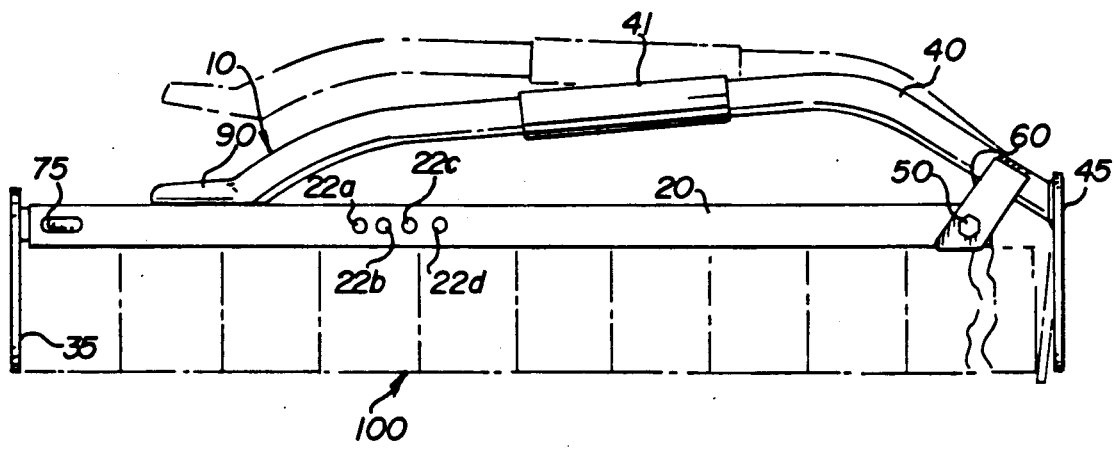
FIG. 1 is a side view of one embodiment of the invention.

The body of the tool shown generally at 10 is provided with a rectangular guide tube 20 having a multiplicity of holes 22a, 22b, 22c and 22d, as best shown in FIG. 1, and 22e, as best shown in FIGS. 6 and 7.

Figure 3:
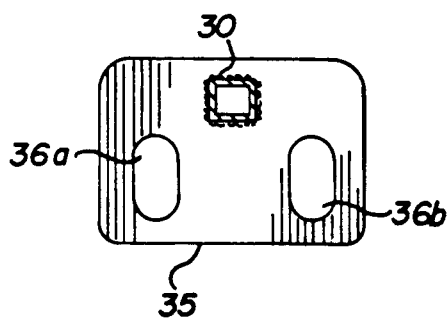
FIG. 3 is an end view taken along 3—3 of FIG. 2.

Interfitted, in slidable engagement, within rectangular guide tube 20 is rectangular slide tube 30, best shown in FIGS. 6 and 7. At the end of slide tube 30, jaw 35 is attached, suitably by welding. As best shown in FIG. 3, the jaw is a relatively wide plate, shown as substantially rectangular in shape with rounded corners and having openings 36a and 36b in the face of the plate. The configuration shown in FIG. 3 is particularly suitable for use as a mortar hoe blade.

Figure 2:
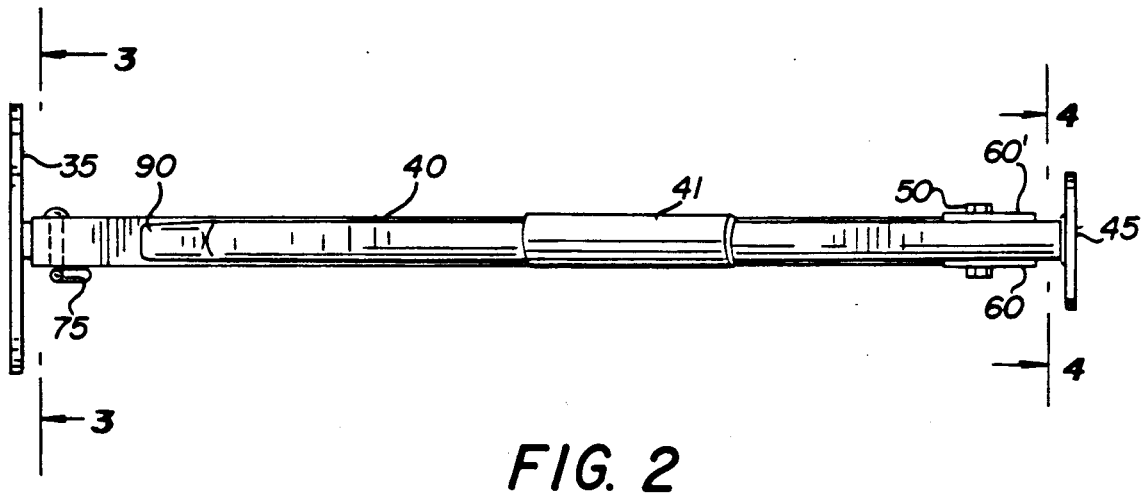
FIG. 2 is a top plan view of the embodiment of FIG. 1.

As can best be seen by reference to FIGS. 1, 2 and 6, when the slide tube 30 is inserted as far as possible within guide tube 20 and cotter pin 75 is passed through aligned openings 22e (see FIG. 6) and 32a (see FIG. 6) of guide and slide tubes 20 and 30, respectively, a minimum distance between brick tongs jaws 35 and 45 is achieved. Typically, the tool, when configured as brick tongs, will be sized so that it holds 9 bricks. The placement of holes in the slide and guide tubes preferably provides distancing the jaws to accommodate, respectively, 9, 10 or 11 bricks. This number of bricks is typically carried by the brick labor helper (hod carrier). The particular number of bricks accommodated is not a part of this invention and the tool can be adapted to carry a lesser and/or a greater number of bricks as required.

A handle 40, suitably with a grip 41 (placed where a worker would hold the tool when using it as brick tongs) and/or a grip 41' (placed where a worker would hold the tool when using it as a mortar hoe), is pivoted on pivot pin 50 by a pivot pin engaging means 60 which, in the illustrated embodiment of the invention, comprises two metal plates 60, 60'. The plates 60, 60' (see FIGS. 1 and 2) extend downwardly from the handle 40, which is bowed. The handle 40 arches over guide tube 30 (see FIG. 2). The plates 60, 60' may be welded or otherwise firmly affixed to handle 40. Openings in the plates accommodate pivot pin 50 about which handle 40 pivots. Jaw 45 is affixed to one end of handle 40. As best shown in FIG. 1, when the tool is placed over a course of bricks 100 and the tool is picked up by handle 40, suitably at grip 41, handle 40 pivots about pivot pin 50. Jaw 45 in cooperation with complementary jaw 35 bites onto and presses together the bricks of course 100.

The handle 40, when the multiple use tool is configured for use as a short or long-handled mortar hoe, functions as a means for working the mortar mixing blade 35.

In one configuration, the long handle configuration, mortar hoe blade 35, sits transversely on a long handle formed by guide and slide tubes 20 and 30 with a substantial length of slide tube 30 extending out of guide tube 20. Handle 40 in the embodiment illustrated in FIG. 6 rests on (engages) the top of guide tube 20. A person working the hoe would grasp guide tube 20 and handle 40 with one hand where the tube and handle come together to prevent movement of the handle during use of the tool as a mortar hoe. The other hand of the person working the hoe would grasp the handle 40, suitably at grip 41' at a point along the handle where it bows downwardly towards jaw 45. Held at this latter location, manipulation (pushing and pulling) is facilitated.

As best shown in FIGS. 1 and 2, a tab 90, extending from the handle, facilitaties holding the handle 40 in engagement with the top of guide tube 20.

The embodiment of the invention illustrated in FIGS. 7 and 8 provides for a facile method of handle retention in conjunction with the handle length adjustment means, namely the pin and hole arrangement previously described.

In FIG. 7, the short handle mortar hoe configuration is described. In the embodiment of the invention illustrated on FIG. 7, at the end of the tube opposite jaw 45, a plug 42 carries protruding locking means 43 which, in the include an opening 44. The opening 44 can be aligned with openings on both the guide and slide tubes. A cotter pin 75, when passed through such openings retains the guide and slide tubes and the handle in position. In this latter embodiment, an opening 23 is formed in the top of guide tube 20 and an opening 33 is formed in the top of slide tube 30 at locations to allow protruding locking means 43 to extend within the slide tube thereby permitting alignment of the hole 44 in the protruding locking means 43 with the holes in the guide and slide tubes. In an alternative version, shown in FIG. 9, a forked end with holes in the prongs 46, 46' which extend on either side of guide tube 20 is used at the end of handle 40. When this latter structure is used, openings in the top of the guide and slide tubes are not required.

Figure 4:
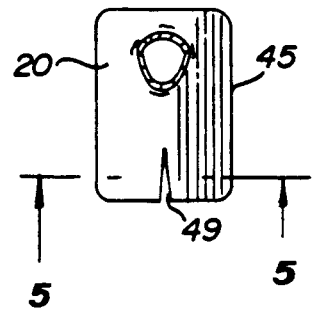
FIG. 4 is an end view taken along 4—4 of FIG. 2.
Figure 5:
FIG. 5 is a cross-section taken along 5—5 of FIG. 4.

As shown in FIGS. 4 and 5, jaw 45 suitably includes band-cutting means 49 in which either edges 47 or 48 of the band-cutting means can be used to cut the metal bands typically used to secure bricks together during transport.

As best shown in FIG. 6, a hole 80 may be drilled through the handle. This hole will allow the tool to accommodate a suspending means such as an eye bolt, hook bolt or equivalent means to suspend the tool when it is not in use at or away from the work place. In a simple arrangement, where the suspending means is a bolt passed through the hole, a nut threaded on the bolt below the handle and another nut threaded on the bolt above the handle can be used to keep the bolt in place, with the eye or hook of the bolt positioned above the handle.

As is at once apparent, the present invention allows a brick layer or his helper to use a single tool, to unpackage, carry and place bricks and to maintain the mortar for said bricks in appropriate admixture.

From the foregoing description it will be apparent that the invention allows for brick tongs to be modified and adapted to operate as a mortar hoe and optionally, also a steel band cutter.

While certain preferred embodiments of the invention have been shown and described, it will be apparent to those skilled in the art that changes can be made in this embodiment without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

We claim:

1. A multipurpose tool adaptable for use as brick tongs and a mortar hoe comprising:
   a. a guide tube having (1) a pivot means end formed by a pivot pin passing through a hole extending through opposing walls of said guide tube and (2) an open guide tube end;

b. an elongated embowed handle arching over said guide tube, said handle having (1) a first clamping means end with a first clamping jaw at said end, said end with the first clamping jaw being rotatably affixed to the pivot pin by pivot pin engaging means extending downwardly and away from the convex side of said handle, whereby the portion of said handle proximate said clamping means end is maintained above and away from the guide tube and (2) an end opposite the end having the first clamping jaw including a means for locking said opposing end to the guide tube;

c. a slide tube carried within said guide tube and extending out from the open guide tube end, said slide tube having at the end extending outside the guide tube, a second clamping jaw complementary to and larger in size than the first clamping jaw, said second clamping jaw forming a mortar hoe blade;

d. a multiplicity of holes in said slide and guide tubes; and e. pin means forming with said holes of said slide and guide tubes a pin and hole adjustment means for varying the length of said multipurpose tool whereby the length can be varied to provide carriage of a specific number of bricks or to provide a hoe handle of preselected length.

2. The multipurpose tool of claim 1 further characterized in that the locking means comprises a hole that is alignable with holes of said slide and guide tubes to form with the pin means an immovable handle for use in working the mortar hoe.

3. The multipurpose tool of claim 2, wherein the first clamping jaw includes wire cutting means.

4. The multipurpose tool of claim 3, wherein the mortar hoe blade is a blade having openings therein to facilitate mortar mixing.

5. The multipurpose tool of claim 2, wherein the mortar hoe blade is a blade having openings therein to facilitate mortar mixing.

6. The multipurpose tool of claim 1, wherein the first clamping jaw includes wire cutting means.

7. The multipurpose tool of claim 6, wherein the mortar hoe blade is a blade having openings therein to facilitate mortar mixing.

8. The multipurpose tool of claim 1, wherein the mortar hoe blade is a blade having openings therein to facilitate mortar mixing.

9. A multipurpose tool adaptable for use as brick tongs and a mortar hoe comprising:

a. a guide tube having (1) a pivot means end formed by a pivot pin passing through a hole extending through opposing walls of said guide tube and (2) an open guide tube end;

b. an elongated embowed handle arching over said guide tube, said handle having (1) a first clamping means end with a first clamping jaw at said end, said end with the first clamping jaw being rotatably affixed to the pivot pin by pivot pin engaging means extending downwardly and away from the convex side of said handle, whereby the portion of said handle proximate said clamping means end is maintained above and away from the guide tube and (2) an end opposite the end having the first clamping jaw, which end is movable into engagement with the guide tube, which end comprises a tab that is formed by a flattened end portion of the end of the tube movable into engagement with the guide tube, whereby such tab facilitates holding the embowed handle in engagement with the surface of the guide tube during use of said tube as a mortar hoe;

c. a slide tube carried within said guide tube and extending out from the open guide tube end, said slide tube having at the end extending outside the guide tube, a second clamping jaw complementary to and larger in size than the first clamping jaw, said second clamping jaw forming a mortar hoe blade;

d. a multiplicity of holes in said slide and guide tubes; and e. pin means forming with said holes of said slide and guide tubes a pin and hole adjustment means for varying the length of said multipurpose tool whereby the length can be varied to provide carriage of a specific number of bricks or to provide a hoe handle of preselected length.

10. The multipurpose tool of claim 9, wherein the first clamping jaw includes wire cutting means.

11. The multipurpose tool of claim 10, wherein the mortar hoe blade is a blade having openings therein to facilitate mortar mixing.

12. The multipurpose tool of claim 9, wherein the mortar hoe blade is a blade having openings therein to facilitate mortar mixing.

13. A multipurpose tool adaptable for use as brick tongs and a mortar hoe comprising:

a. a guide tube having (1) a pivot means end formed by a pivot pin passing through a hole extending through opposing walls of said guide tube and (2) an open guide tube end;

b. an elongated embowed handle arching over said guide tube, said handle having a first clamping means end with a first clamping jaw at said end, said end with the first clamping jaw being rotatably affixed to the pivot pin by pivot pin engaging means extending downwardly and away from the convex side of said handle, whereby the portion of said handle proximate said clamping means end is maintained above and away from the guide tube;

c. a slide tube carried within said guide tube and extending out from the open guide tube end, said slide tube having at the end extending outside the guide tube, a second clamping jaw complementary to and larger in size than the first clamping jaw, said second clamping jaw forming a mortar hoe blade;

d. a multiplicity of holes in said slide and guide tubes; and e. pin means forming with said holes of said slide and guide tubes a pin and hole adjustment means for varying the length of said multipurpose tool whereby the length can be varied to provide carriage of a specific number of bricks or to provide a hoe handle of preselected length; and f. wire cutting means, said wire cutting means located on said first clamping jaw.

14. The multipurpose tool of claim 13, wherein the handle has an end opposite the end having said clamping jaw which includes means for locking said opposing end to the guide tube.

15. The multipurpose tool of claim 14, further characterized in that the locking means comprises a hole that is alignable with holes of said slide and guide tubes to form with the pin means an immovable handle for use in working the mortar hoe.

* * * * *